US007014234B2

(12) United States Patent
Walker

(10) Patent No.: US 7,014,234 B2
(45) Date of Patent: Mar. 21, 2006

(54) INTEGRATED CORNER CASTING LOCKING MECHANISM FOR SHIPPING CONTAINERS

(76) Inventor: Peter Walker Walker, 333 1st St., Apt. C222, Seal Beach, CA (US) 90740

( * ) Notice: Subject to any disclaimer, the term of this patent is extended or adjusted under 35 U.S.C. 154(b) by 295 days.

(21) Appl. No.: 10/145,410

(22) Filed: May 14, 2002

(65) Prior Publication Data

US 2003/0214143 A1 Nov. 20, 2003

(51) Int. Cl.
*B66C 1/66* (2006.01)
*B65G 1/14* (2006.01)
*B60P 1/64* (2006.01)

(52) U.S. Cl. ...................... 294/81.53; 220/1.5; 410/82; 410/84

(58) Field of Classification Search ............... 294/81.5, 294/81.52, 81.53; 206/503, 504, 506, 509, 206/511, 512; 220/1.5, 23.4, 23.6; 410/82, 410/84

See application file for complete search history.

(56) References Cited

U.S. PATENT DOCUMENTS 3,015,407 A * 1/1962 Fesmire et al. .............. 220/1.5
3,493,258 A * 2/1970 Wyrough ................. 294/81.53
3,501,193 A * 3/1970 Gray ....................... 294/81.53
3,552,557 A * 1/1971 Green ........................ 414/607
3,633,777 A * 1/1972 Snelling et al. ............. 414/608
3,677,599 A * 7/1972 Shannon .................. 294/81.53
3,691,595 A * 9/1972 Backteman et al. ......... 220/1.5
3,712,661 A * 1/1973 Strand ..................... 294/81.53
3,734,308 A * 5/1973 Pasternack ................... 410/84
3,888,536 A * 6/1975 Durenec .................. 294/81.53
3,980,185 A * 9/1976 Cain ....................... 294/81.53
4,093,090 A * 6/1978 Whiteman ............... 294/81.53
4,149,747 A * 4/1979 Portz et al. .............. 294/81.53
4,341,495 A * 7/1982 Del'Acqua ............... 294/81.53
4,356,145 A * 10/1982 Brandes et al. ............. 376/265
4,630,856 A * 12/1986 Peeters Weem et al. . 294/81.53
4,648,645 A * 3/1987 Lundgren ................ 294/81.53
5,163,726 A 11/1992 Boos et al.
6,135,524 A * 10/2000 Faller et al. ............. 294/81.53

FOREIGN PATENT DOCUMENTS

DE 2054868 * 5/1971 .............. 294/81.53
GB 2048821 * 12/1980 .............. 294/81.53
JP 0178193 * 7/1990 .............. 294/81.53
JP 0216485 * 9/1991 .............. 294/81.53
SU 0654531 * 3/1979 .............. 294/81.53
SU 0802163 * 2/1981 .............. 294/81.53
SU 0812690 * 3/1981 .............. 294/81.53
SU 0819140 * 4/1981 .............. 294/81.53
SU 927718 * 5/1982 .............. 294/81.53
SU 1726356 * 4/1992 .............. 294/81.53
WO WO 85/00578 * 2/1985 .............. 294/81.53

* cited by examiner

*Primary Examiner*—Dean J. Kramer
*Assistant Examiner*—Paul T. Chin

(57) ABSTRACT

A system for locking and unlocking containers to transport modes and other containers comprises a plate and spring housed in an upper corner fitting of a container, a cable connected to the plate, and guides to route the cable from the plate to a rotatable locking leg housed in a lower corner fitting of the container. The twist lock of a lifting spreader engages the upper corner fitting of a container, urging the plate and spring in the upper corner fitting downward. The cable is pulled downward by the depression of the plate, accordingly pulling the locking leg, causing it to rotate to an unlocked position.

6 Claims, 9 Drawing Sheets

INTEGRATED CORNER CASTING LOCKING MECHANISM FOR SHIPPING CONTAINERS

BACKGROUND

1. Field of Invention

This invention relates generally to the locking of shipping containers. More particularly, this invention relates to a mechanism for connecting and disconnecting bulk containers to a base, such as, but not limited to, chassis, railcars, ship hatches, airline cargo decks, terminal decks, and other containers.

BACKGROUND

2. Description of Prior Art

When transporting or stacking bulk containers a locking device is needed to secure the containers to a base. The base could be an integral part of a transport vehicle, such as: truck chassis, railcar, aircraft, or a ship hatch. Additionally, a base could be an adjacent container, when the containers are stacked onboard ships, rail cars, or in container yards. These locking devices are numerous including: cones, twist locks, lashing bars and other systems. Although these devices and systems are currently used to connect containers to various bases they posses a number of disadvantages that make them unsafe and inefficient.

Currently a device called a cone is used when connecting containers to a ship's hatch or other containers. Cones come in three forms, manual cones, automatic cones, and below deck cones. Cones are generally two tetrahedron shaped objects wherein the bases of the tetrahedrons are rectangular in shape and the bases of the tetrahedrons are base to base, such that the cones, when in an unlocked position, are in the shape of an octahedral diamond. At least one of the tetrahedrons can rotate such that the bases are no longer aligned, and when inserted between container corner castings can connect containers.

Manual cones are inserted into corner castings of a container that will connect to a ship hatch or another container. These cones are inserted into the corner castings manually when a lifting device raises the container off a chassis. The cone is inserted into the corner casting access slot of a container; and the head that is in the access slot is manually turned such that the head is locked into the corner casting. Once the cones are inserted in all four lower corner castings the container is lifted to its position on the ship and lowered onto the deck or another container where the bottom head of the cone mates with the deck or upper corner casting of a lower container. The bottom head is then manually turned such that the head is locked into the corner casting thereby locking the container to a base.

Manual cones have a number of disadvantages. Cones require manual locking and unlocking, incurring additional labor costs and placing humans in potentially dangerous situations. Additionally, they require personnel to work both on vessels and on the ground, again increasing labor costs. Laborers are required to work around and beneath suspended containers, which weigh many tons even when empty or at great heights. In addition, when cones are not inserted or turned into the locking position they can become detached from a container causing additional problems, such as an unsecured connection between a container and a base or, when being hoisted by a lifting device, the cone can fall from the container, injuring or killing personnel. Further, a cone is one form of a number of similar locking devices used to secure containers, such that additional equipment and additional purchase and maintenance costs are incurred. Lastly, recent U.S. regulations have required that all cones used at U.S. ports be of the automatic type due to safety considerations, causing the manual cones to be unsuitable for use in the U.S.

Automatic cones are similar to manual cones in design however, when automatic cones are mated to a base they lock automatically. Although automatic cones eliminate the need to manually lock containers to a base, they still require a manual release, still placing personnel into dangerous work environments. For instance, containers are often stacked five, six or even seven high on board ship hatches, requiring personnel to work at great heights. Furthermore, automatic cones have a number of the disadvantages that manual cones posses, including: requiring personnel to work both on vessels and on the ground, the cones can fall free injuring or killing personnel below, and an automatic cone is one form of a number of similar locking devices used to secure containers such that additional equipment and therefore additional purchase and maintenance costs are incurred.

The twist lock is yet another device that is used to connect containers to a chassis. Twist locks are comprised of a locking pin and a handle. The locking pin has a shaft that runs through the bolster of a chassis, which can be rotated. The locking pin also has a head which is rectangular in shape at its base and is cone shaped at it's top. Bulk containers have corner castings with access slots at their top and bottom such that when the container is mounted on a chassis the head of the twist lock can mate with the access slot. The access slot is an opening in the corner casting of a container with which the pin head can mate when the pin head is in an open position but cannot mate or disconnect when the pin is in a locked position. When the locking pin mates with the corner casting, a handle connected to the shaft of the locking pin is manually turned, which in turn, twists the pin head inside of the corner casting such that the base portion of the pin head connected to the shaft is now askew in relation to the opening in the corner casting access slot, such that the container cannot be disconnected from its base.

Although twist locks address some of the limitations of the previous devices, they also posses a number of disadvantages. Still, the system requires a person to manually open and close the twist locks in order to connect or disconnect a container from its transport base. This manual requirement can put a person in a dangerous work environment where heavy machinery is lifting tons of equipment thereby putting an individual at risk for injury or death.

A second disadvantage of twist locks is the procedures that are adopted to prevent personnel from having to unlock containers from their bases in dangerous environments. A common practice is to require personnel to unlock containers from a chassis as the container enters a yard to prevent them from having to do so around heavy machinery and suspended containers. This method can create a number of dangerous situations in a yard. First, the container is no longer connected to the tractor and chassis, it is merely resting on the chassis. If an accident were to occur, the container is not connected to the chassis, causing an unpredictable and potentially dangerous situation. Additionally, while driving around a yard, the twist locks often turn accidentally into the locked position requiring the driver to exit the safety of his vehicle to reopen the twist lock, thereby defeating the goal of the procedure. It is not uncommon for lifting devices, such as top pickers and cranes, to drag or lift the truck along with the container. These are very dangerous situations for drivers and anyone else that might be in the area. A third disadvantage is that a twist lock is again one form of a number of similar locking devices used to secure containers such that additional equipment and therefore additional purchase and maintenance costs are incurred.

Another disadvantage of current methods for securing containers to transport modes relates to the rail industry. When containers are stacked one or two high on rail cars, the lower container simply sits in the well of the car and has no means of being connected to the car. This is because there is no way to access the lower corner fittings of a container that is sitting in the well of the rail car. As a result, there is no way to manually unlock a manual or automatic cone or twist lock.

An additional disadvantage of these devices is the number of different locking devices utilized to perform a single function, connecting or disconnecting containers from a base. A single, fully automatic, device should be used to connect containers to chassis, railcars, ship hatches or other containers to improve safety and efficiency between different transport modes.

Inventions have been developed to overcome the above mentioned problems including Del Aqua's in 1982 (U.S. Pat. No. 4,341,495) and Cain's in 1976 (U.S. Pat. No. 3,980,185) These prior art forms however were not commercially viable; because the components of the inventions are intrusive into the interior space of a container, susceptible to being damaged by equipment or cargo moving into and out of containers, and would require modifications to the doors of a container. In addition, these inventions require all four upper corner castings of a container to be engaged by rotatable twist locks of a spreader which is not possible when using machines which only engage two of the upper corner castings or sites that use fork lifts to lift containers. Lastly, the number of moving parts that comprise these art forms would be difficult and expensive to maintain in a fleet of containers spread around the world.

It is common practice in container yards to simply stack containers in piles without securing them to one another, because it is not required by federal or state safety regulations. Additionally, equipment costs are prohibitive; cones are provided by vessels, not stevedoring companies or container yards. The additional labor required to set, lock, and unlock connecting devices is also costly.

There are hazards inherent by not connecting the containers together while in a stacked configuration, such as building a disorderly pile. While one container is being added to a stack of containers, the container being stacked may nudge another container in the stack, causing it to fall. The fallen container may not be obvious to the operator of the lifting device. For obvious reasons, this is an extremely undesirable and dangerous situation, potentially causing great damage and injury.

As can be seen by existing solution attempts, the problem of providing a safe, economical, universal, and automatic means to secure containers has not been fully addressed. Existing methods can require placing humans in dangerous situations, require many costly parts, require manual locking and unlocking, and create disorderly piles.

What is needed is a locking device that can safely, securely, and automatically lock and unlock a container from a base quickly, requiring a minimum of direct human manipulation. What is also needed is a locking device that has no detached parts, eliminating that safety concern. What is additionally needed is a locking device that meets current safety standards and regulations. What is further needed, is a locking device that can be engaged on rail cars. What is again further needed is a locking device that does not excessively protrude into the interior cargo space of a container. What is still further needed is a locking device that can be automatically disengaged by the insertion of fork lift tines. What is again needed is a locking device that can enable the lifting of a container by just two of the four upper corner castings. What is also needed is a locking device that can be applied to existing modified containers, without the need to modify supporting equipment. What is finally needed is a locking device that provides a means to stack containers in orderly and stable piles.

OBJECTS OF THE INVENTION

It is a general object of the present invention to provide a container locking device that can safely, securely, and automatically lock and unlock a container from a base quickly, requiring a minimum of direct human manipulation.

It is another object of the present invention to provide a container locking device that has no detached parts.

It is yet another object of the present invention to provide a container locking device that meets or exceeds current safety standards and regulations.

It is a further object of the present invention to provide a container locking device that can be engaged on ship decks, ship holds, rail cars, airplane cargo decks, truck chassis, other containers, and any number of other container transportation means.

It is yet a further object of the present invention to provide a container locking device that does not excessively protrude into the interior cargo space of a container.

It is another object of the present invention to provide a container locking device that can be automatically disengaged by the insertion of fork lift tines.

It is yet another object of the present invention to provide a container locking device that can enable the lifting of a container by just two of the four upper corner castings.

It is a further object of the present invention to provide a container locking device that can be applied to existing modified containers, without the need to modify supporting equipment.

It is yet a further object of the present invention to provide a container locking device that provides a means to stack containers in orderly and stable piles.

Other objects and features of advantage will become apparent as the specification progress and from the claims.

SUMMARY OF THE INVENTION

In accordance with the present invention, a system for locking and unlocking containers to transport modes and other containers is provided. The present invention is comprised of a plate and spring housed in an upper corner fitting of a container, a cable connected to the plate, and guides to route the cable from the plate to a rotatable locking leg housed in a lower corner fitting of the container. Wherein, the twist lock of a lifting spreader engages the upper corner fitting of a container, urging the plate and spring in the upper corner fitting downward. The cable is pulled downward by the depression of the plate, accordingly pulling the locking leg, causing it to rotate to an unlocked position. This corner fitting assembly can be installed on either one or all four corners of the container.

In an alternate embodiment, horizontal cables couple the lower corner fittings together, so that if any cable is tensioned, all locking legs in the lower corner fittings will simultaneously rotate into the unlocked position. Two of these horizontal cables intersect the tine well. The tension can either be imparted from depressing the plate located in the upper corner fitting, causing all locking legs to rotate to the unlocked position. Alternatively, if the tine of a fork lift or other similar lifting vehicle is inserted into the tine well of the container, the tine will lift the cable portion intersecting the tine well, tensioning the cable, again causing all locking legs to rotate to the unlocked position.

In addition, the locking leg can be of many shapes and comprised of a single unit or multiple parts so long as the leg stays within the lower corner fitting when lifted by a lifting device, able to withstand the forces, dictated by international standards, to secure a container to it's base and is able to mate with and rotate within bases such that when the locking leg is in a locked position the locking leg and access slot of the base are not aligned and therefore cannot separate.

The lower corner fitting can be a single unit or comprised of multiple parts as described in the drawings and text of this application, providing the lower corner fitting can house, support, and allow the locking leg to rotate.

To lock securely to a structure, the locking legs need to engage a base. A base is a vertically directed access slot in a surface such that a locking leg can mate with, rotate in, and lock to the underside of the access slot. For example, a square tube with access slots embedded into the surface of a container yard or access slots in the cargo deck of an aircraft could be a base.

An alternate design is a base having slotted vertical access openings on both the ceiling and floor of the base such that the base can be used as an adapter to receive and lock to the male locking legs of the present invention and the twist lock devices currently used to lock containers to transport modes such as, but not limited to, chassis.

An additional advantage of the present invention is that a single device will be used to connect containers to bases. This will decrease the purchase and maintenance costs connected to cones and chassis twist locks; again decreasing costs to the transportation industry.

All of the disadvantages of the prior art have been addressed by the present invention. As can be seen in the description, an automatic locking system for cargo containers that requires a minimum of direct human intervention is provided. No personnel is required to directly contact the container at any point during the loading and unloading process, saving both labor time and reducing exposure to potentially unsafe situations. Additionally, no loose parts are required, reducing the chance of falling object injury. The present invention also enables the industry to meet safety standards. A secondary safety related advantage of the present invention will be a decrease in the costs associated with on the job injuries that occur around container operations. These decreased costs will be realized by the transportation industry and ultimately consumers.

DESCRIPTION OF THE PREFERRED EMBODIMENTS

The detailed description set forth below in connection with the appended drawings is intended as a description of presently-preferred embodiments of the invention and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

Figure 1:
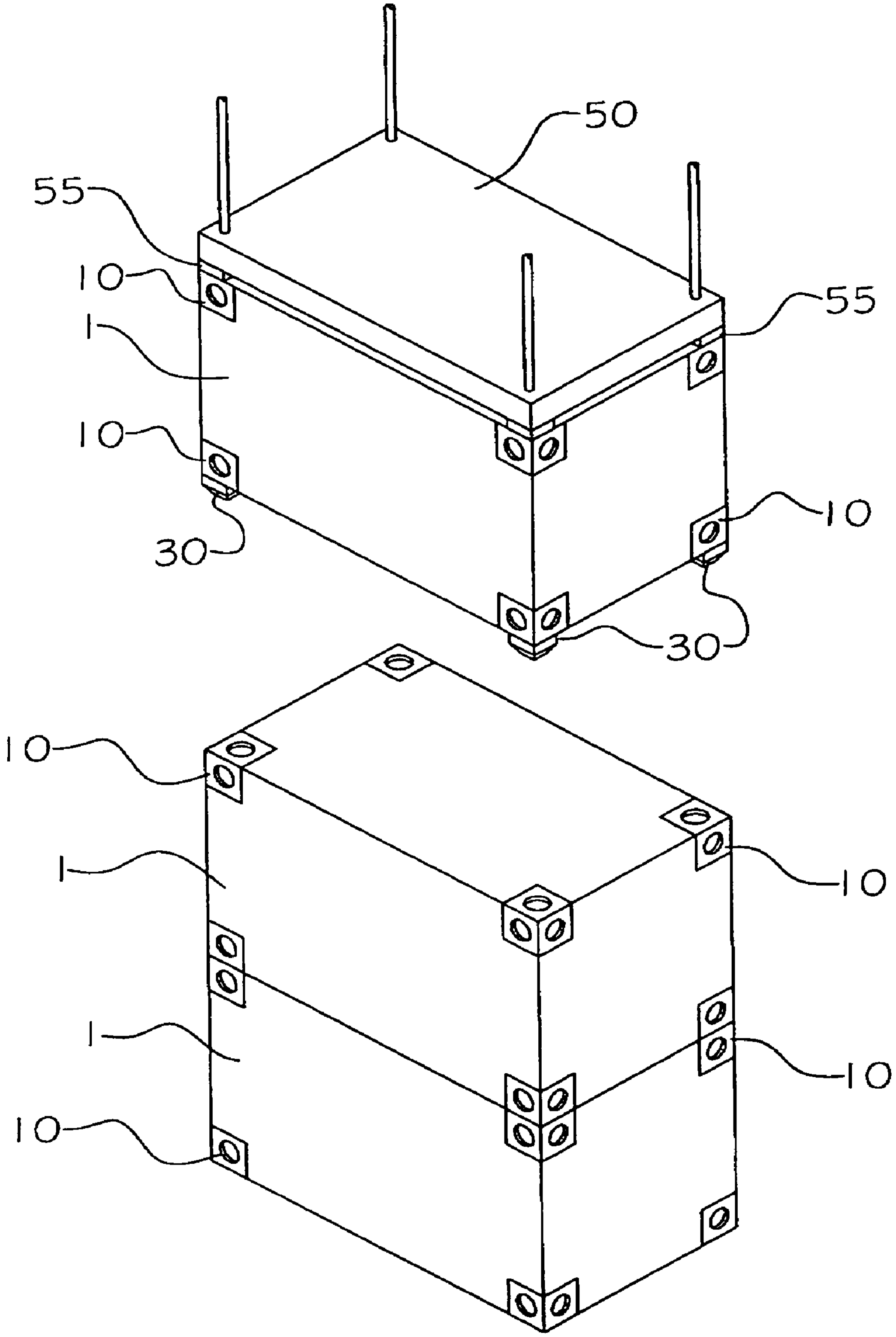
FIG. 1 is a perspective view of the present invention installed on a container, being stacked by a spreader.

As can be seen in FIG. 1, two containers 1 are stacked, one on top of the other, and a third container 1 is suspended above the stacked containers 1 by a lifting spreader 50, in preparation to stack the third container 1. Each container has a total of eight corner fittings 10, four lower corner fittings 10 and four upper corner fittings 10 where the upper corner fittings 10 of the lower containers 1 serve as bases for the containers 1 on top of them.

The four locking legs 30 of the third container 1 are aligned with the four corner fittings 10 of the upper stacked container 1. As the third container 1 is lowered on to the upper stacked container 1, the locking legs 30 are guided into the corner fittings 10. The locking legs 30 of the third container 1 will return to a locked position when the lifting spreader 50 has lowered the third container 1 onto the upper stacked container 1 and disengages from the corner fittings 10 of the third container 1, causing the third container 1 to be locked to the now middle stacked container 1. The third container 1 is then restricted in movement. This particular action of locking will be discussed in further detail in the proceeding description.

Figure 2:
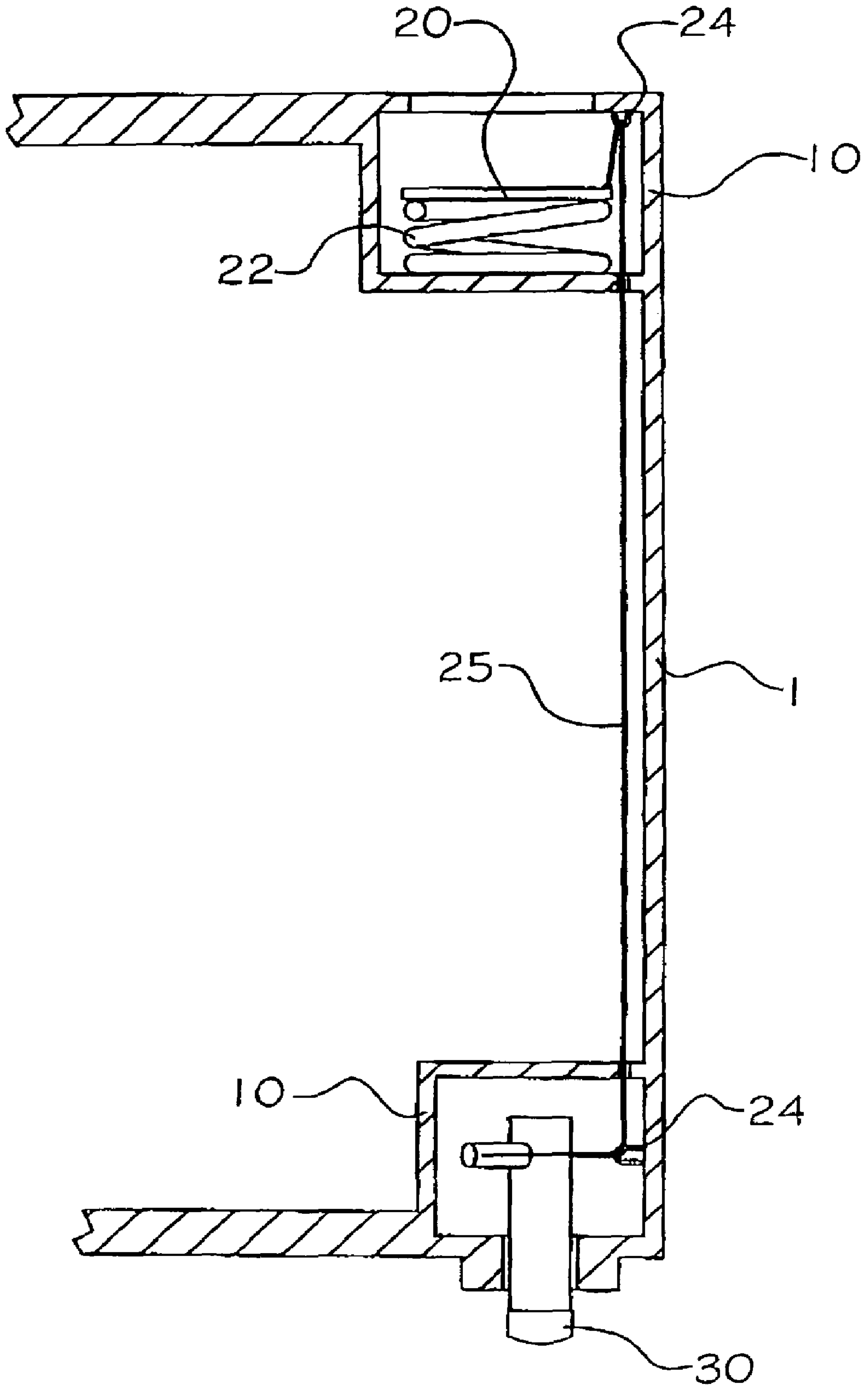
FIG. 2 is a cross-sectional side view of a cargo container, showing the present invention.

Looking more particularly at FIG. 2, a cutaway of a container more clearly illustrates the present invention. At least one of the upper corner fittings 10 houses a compression plate 20, a spring 22, and a guiding eye 24. The guiding eye 24 can be any number of pivoting means enabling a change in the direction of a force applied to the vertical connecting line 25, eyelet, or other similar devices. Additionally, the guiding eye 24 can be attached to the corner fitting 10 or to any other appropriate structure found within or around the container 1.

A vertical connecting line 25, having one end attached to the compression plate 20, runs upward through a guiding eye 24, pivoting down and exiting the upper corner fitting 10. The vertical connecting line 25 traverses the height of the container, enters the lower corner fitting 10, pivots at the second guiding eye 24, and is attached to the locking leg 30 through the connecting line attachment means 35. The vertical line 25 can be any number of translational coupling devices, such as a cable or a rigid coupler utilizing a mechanism other than the guiding eye 24.

Still referring to FIG. 2, as the compression plate 20 is depressed by a load, the vertical connecting line 25 is pulled down accordingly, pivoting at the upper guiding eye 24, and causing a general upward movement in the vertical connecting line 25. The vertical connecting line 25 is again pivoted at the lower guiding eye 24, and in turn, imparts a rotational motion to the locking leg 30, causing it to move into the unlocked position (FIG. 6*b*). In a similar, but opposite manner, when the load is lifted from the compression plate 20, the downward tension is reduced, allowing a torsional return means 23 to impart a rotational motion on the locking leg 30, causing it to return to the locked position.

Figure 3A:
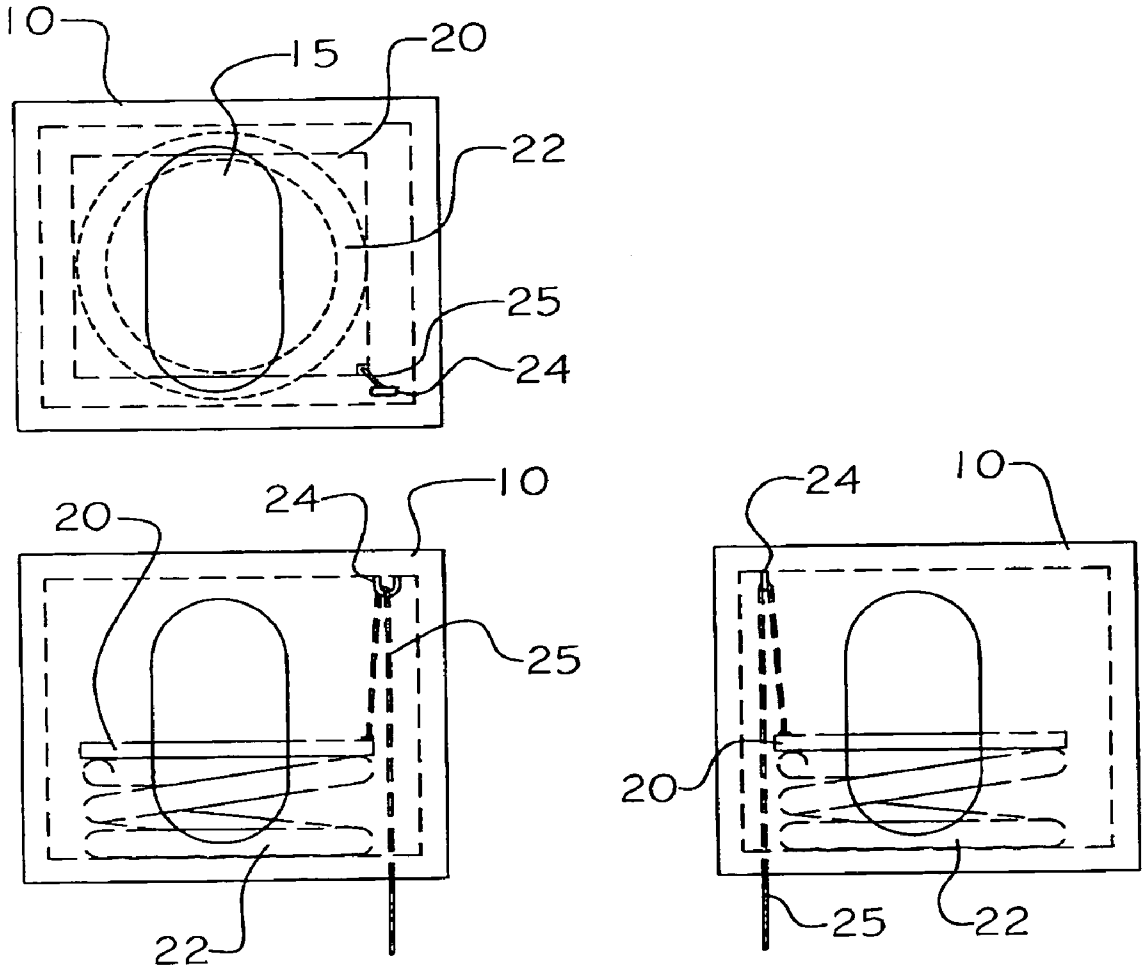
FIG. 3*a–c* is a top, front, and side view of an upper corner casting with a partial phantom view of the present invention, additionally showing a magnified view of the locking leg.

The upper corner fitting 10 is illustrated more precisely in FIG. 3*a*. The compression plate 20 and spring 22 are housed within the upper corner fitting 10, the vertical connecting line 25 being attached to the compression plate 20. The guiding eye 24 receives the vertical connecting line 25, pivoting it downward towards the lower corner fitting 10. Referring to the top plan view of FIG. 3*a*, the vertically directed access slots 15 receives a lifting spreader twist lock 55 of a lifting spreader 50. The lifting spreader twist lock 55 depresses the compression plate 20, again causing the locking leg 30 to twist into the locked position.

Figure 3B:
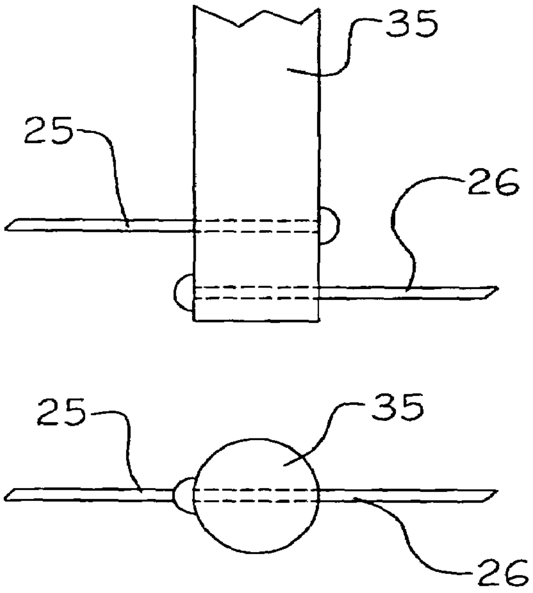
Figure 3C:
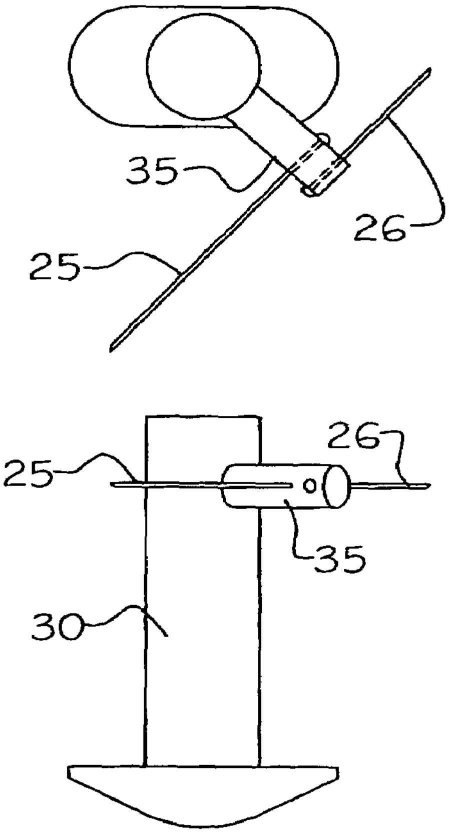

As illustrated in FIGS. 3*b* and 3*c*, an example of an isolated locking leg 30 of the present invention shows the connection between the connecting line attachment means 35 and the vertical connecting line 25 and the horizontal connecting line 26. The connecting line attachment means 35 acts a lever arm, allowing a movement of either of the lines to impart a rotational motion on the locking leg 30. The binding of the lines to the connecting line attachment means 35 can be achieved by threading the lines through a hole, as illustrated, or any number of connecting means common to industry.

Figure 4:
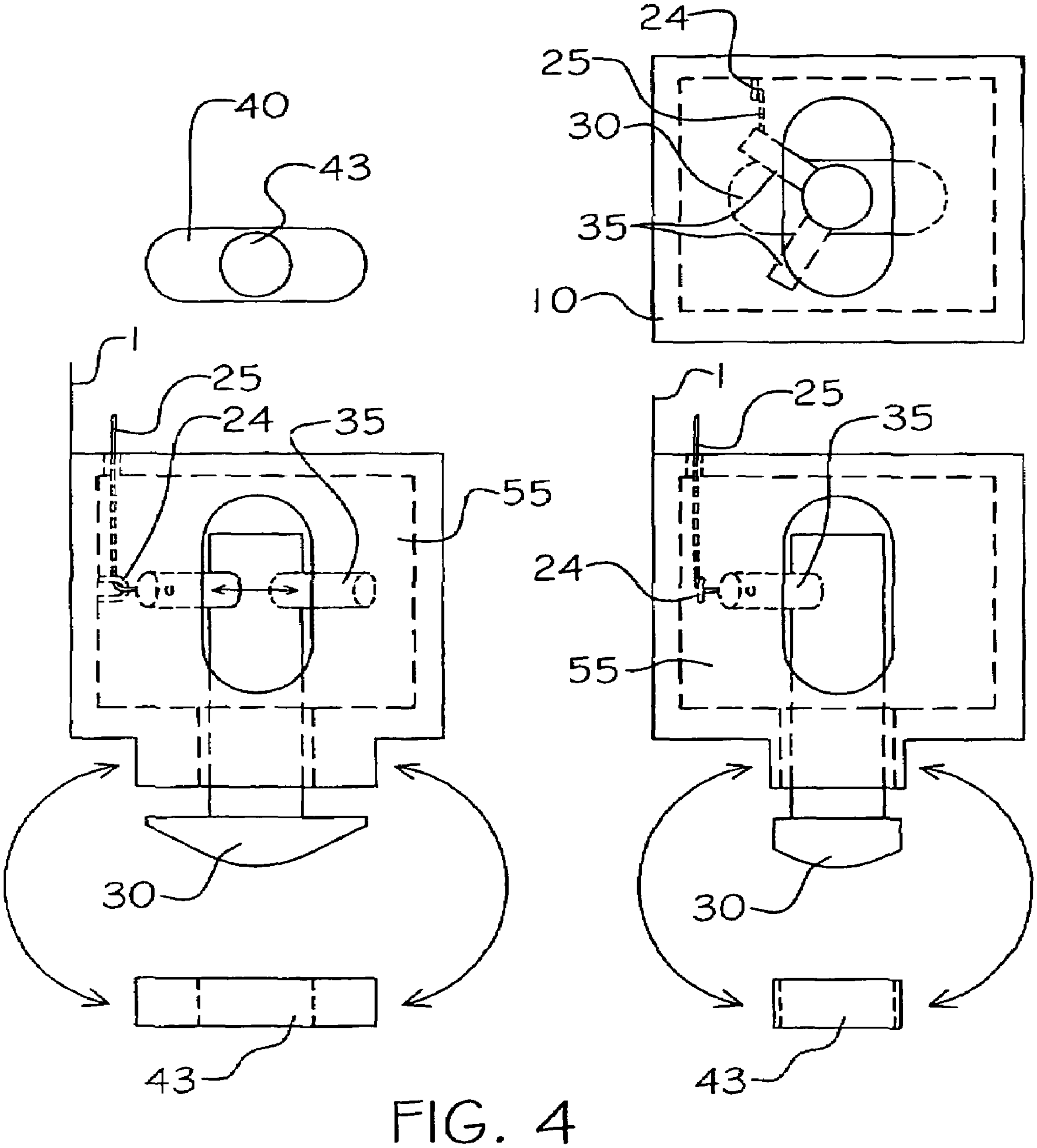
FIG. 4 is a top, front, and side view of a lower corner casting showing the rotation of the present invention.

FIG. 4 shows a top view, front view, and side view of a lower corner fitting 10, which houses a guiding eye 24, a locking leg 30, and a connecting line attachment means 35 with a vertical connecting line 25 attached thereto. The locking leg 30 is partially contained within the lower corner fitting 10; the remainder extends beneath the lower corner fitting 10, through the locking leg well 43 of the plug 40. The portion of the locking leg 30 contained within the lower corner fitting 10, is shown with the connecting line attachment means 35 being pulled by the vertical connecting line 25. As a result, the portion of the locking leg 30 below the lower corner fitting 10 rotates, either locking or unlocking the locking leg 30, when the locking leg 30 is inserted into an adjacent corner fitting 10 of another container or any other receiving means.

Figure 5A:
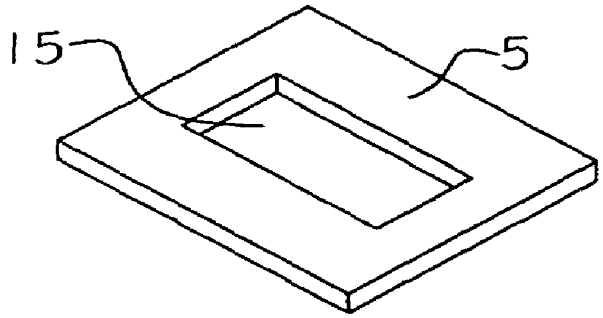
FIGS. 5*a–c* are perspective views of the base.
Figure 5B:
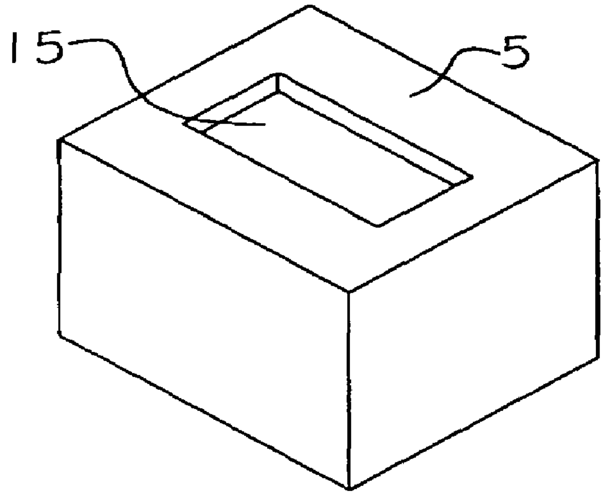
Figure 5C:
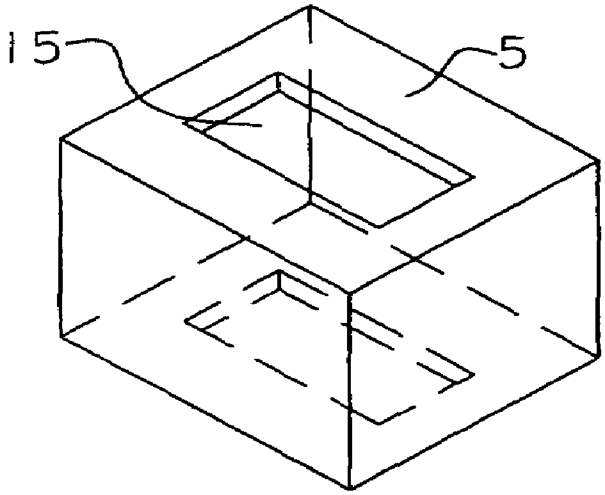

Referring to FIGS. 5*a–c* various bases 5 can be seen. Each variation of the base 5 has at least one vertically directed access slot 15 to receive a locking leg 30 of the present invention. A variety of base 5 designs may be utilized embodying the basic principal of the disclosed design. These bases 5 may be installed on ship decks, cargo holds, truck chassis, train cars, or wherever necessary.

Figure 6A:
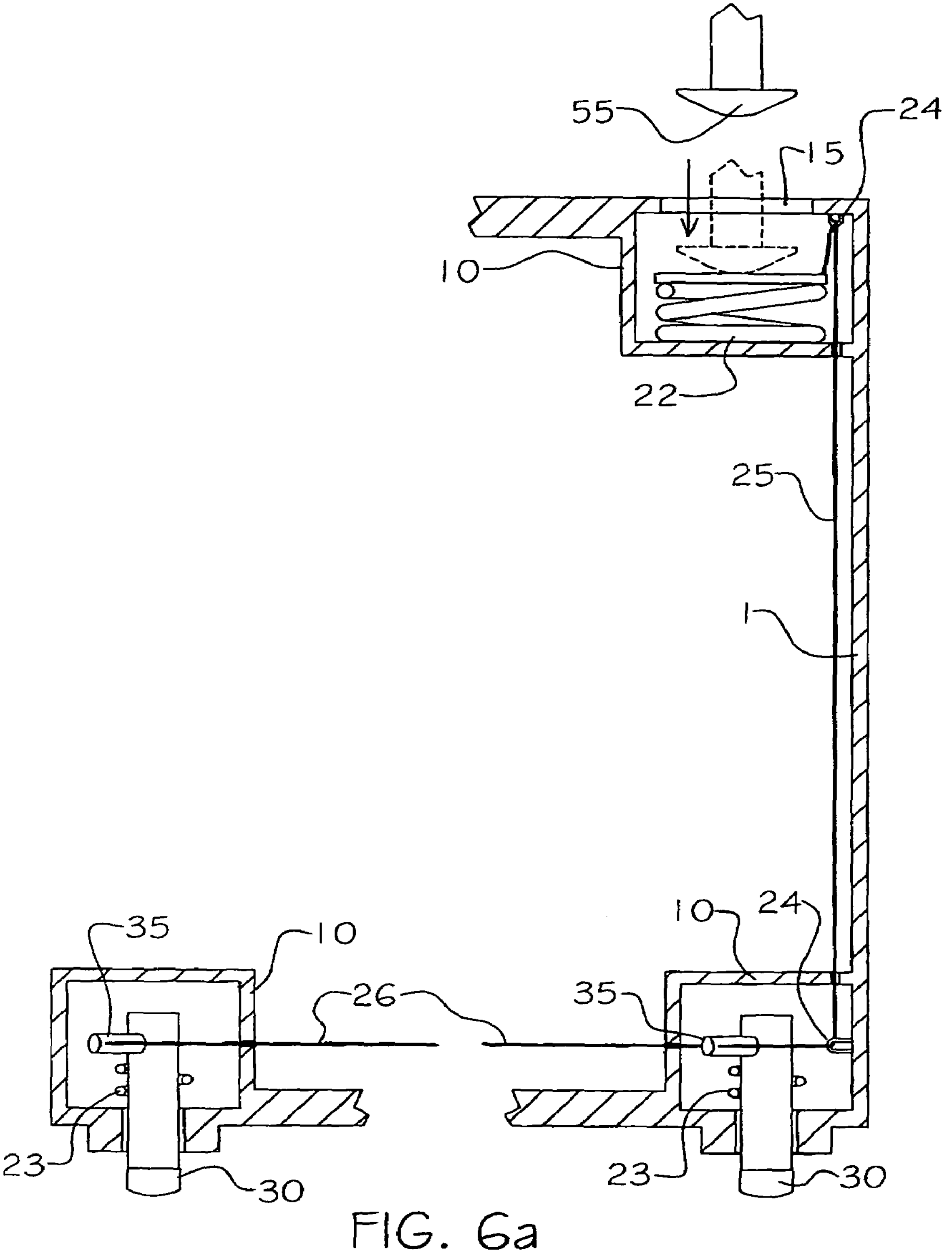
FIGS. 6*a–b* are operational drawings of a spreader twist lock as it mates with an upper corner casting and causes locking legs of lower corner castings to rotate.
Figure 6B:
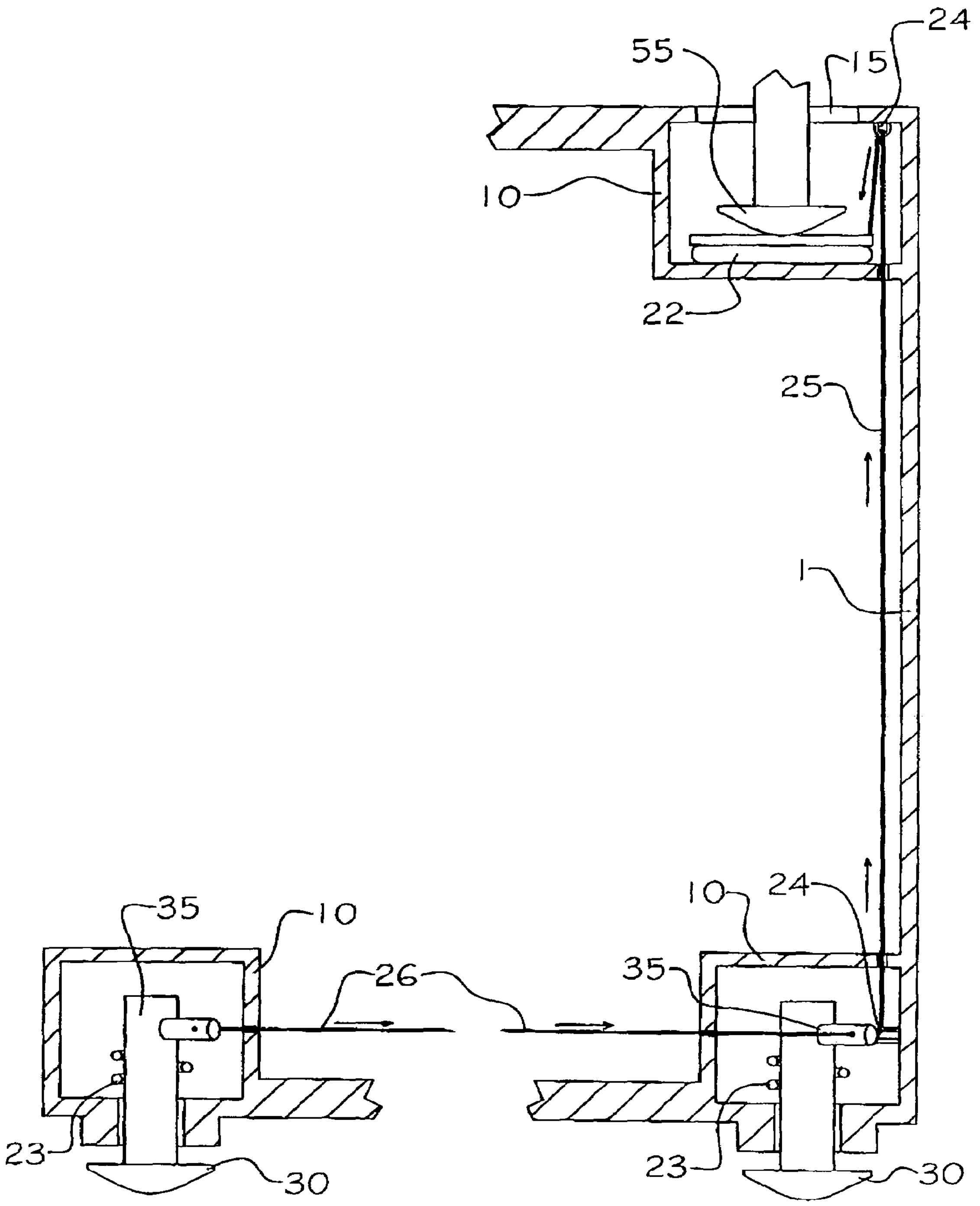

As can be seen in FIG. 6*a*, a lifting spreader twist lock 55 prepared to engage the upper corner fitting 10 of the container 1, through the vertically directed access slot 15. As described previously, a vertical connecting line 25 couples the compression plate 20 with the connecting line attachment means 35. The horizontal connecting line 26 couples a first lower corner fitting 10 with an adjacent lower corner fitting 11 on the same container 1. It can be seen that a torsional movement of the locking leg 30 of the first corner fitting 10 will impart a rotation on the second locking leg 30 located in the adjacent lower corner fitting 10. When the lifting spreader twist lock 55 is disengaged from the upper corner fitting 10 of the container 1, the load is lifted from the compression plate 20, and the downward tension is reduced, allowing a restoring spring 23 to impart a rotational motion on the locking leg 30, causing it to return to the locked position.

Looking at FIG. 6*b*, a lifting spreader twist lock 55 is engaged in the upper corner fitting 10 of the container 1, through the vertically directed access slot 1S. The compression plate 20 is depressed and, in a manner previously described, imparts a rotational motion of the locking leg 30 of the first lower corner fitting 10, causing it to move into the unlocked position. The horizontal connecting line 26, as a result, is tensioned, thus imparting a rotation on the second locking leg 30 located in the adjacent lower corner fitting 10, causing it to move into the unlocked position. In this way, any locking legs 30 of the corner fittings 10 located at each corner of the container 1 move simultaneously into the locked or unlocked position.

Figure 7A:
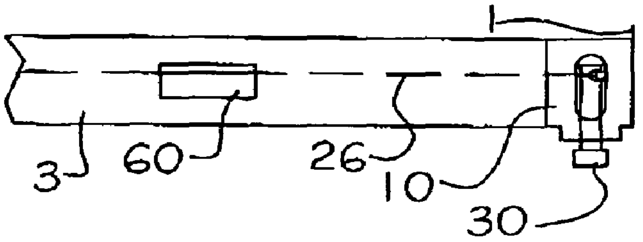
FIGS. 7*a–e* show plan views of the present invention's horizontal cables.
Figure 7B:
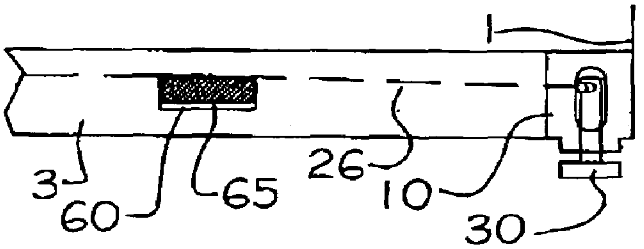

This horizontal connecting line 26 passes through the tine well 60 in route to the adjacent lower corner fitting 10, traveling through the container rail 3, partially protruding into the tine well 60, as seen in FIGS. 7*a–b*. As the tine 65 of a lifting device is inserted into the tine well 60, the tine 65 imparts a lateral movement on the horizontal connecting line 26. The lateral translation of the horizontal connecting line 26, in turn, imparts a rotational motion on the surrounding locking legs 30 on each corner of the container 1, causing them to rotate into the unlocked position.

Figure 7C:
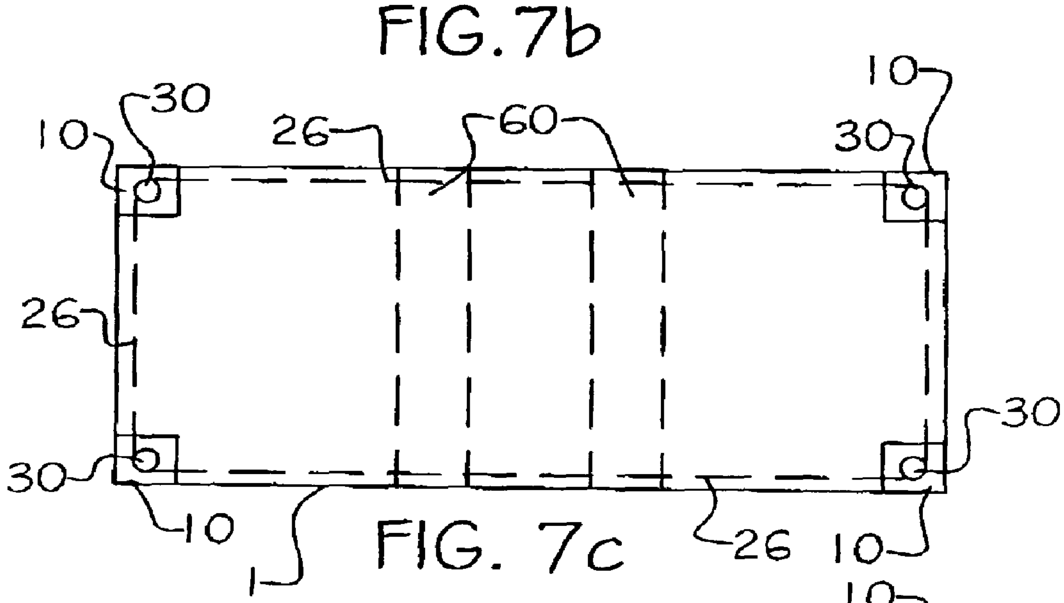
Figure 7D:
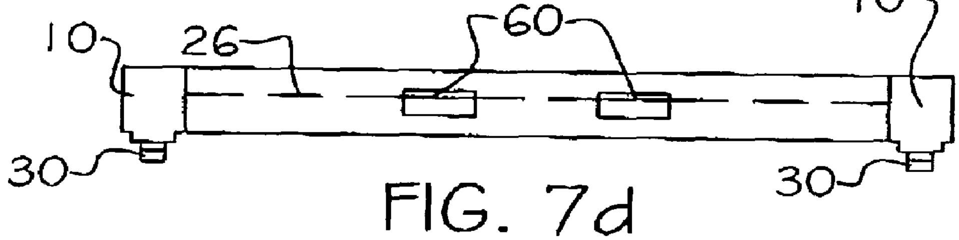
Figure 7E:
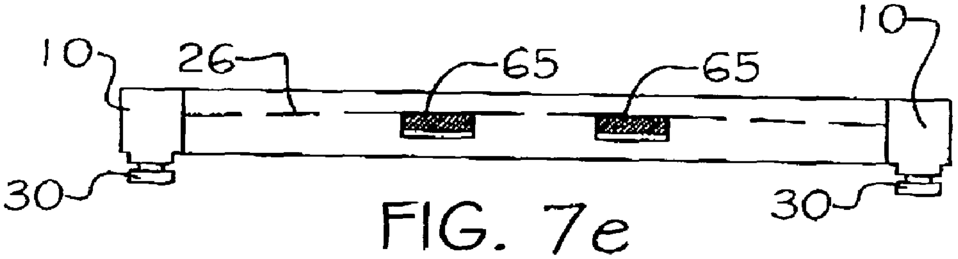

An overview of the interaction between the four locking legs 30 located at each lower corner of the container 1 can be seen in FIG. 7*c*. Two horizontal connecting lines 26 intersect the tine wells 60. The remaining two horizontal connecting lines 26 are on both ends of the container 1, generally parallel to the tine wells 60. As the tine 65 of a lifting device is inserted into either side of the tine well 60, the tine 65 tensions the horizontal connecting line 26, imparting a rotation on each of the four locking legs 30, urging them into the unlocked position. FIGS. 7*d–e*, show a side view of this same action.

While the present invention has been described with regards to particular embodiments, it is recognized that additional variations of the present invention may be devised without departing from the inventive concept.

I claim:

1. A shipping container locking system comprising:

an upper housing, said upper housing being located at an upper corner of a shipping container, said upper housing having an interior volume, said upper housing having a bottom interior surface, said upper housing having a top face, said top face having an orifice formed therethrough, said orifice configured to receive a locking leg from an adjacent shipping container;

a plate having a top surface and a bottom surface, said plate being located within the interior volume of said upper housing of said shipping container;

a spring, said spring compression being attached to said plate and said upper housing, said spring communicating elastically between said bottom surface of said plate and bottom interior surface of said upper housing, said spring having a spring force such that said plate is normally forced away from said bottom interior surface of said upper housing;

a lower housing, said lower housing being located at a lower corner of said shipping container, said lower housing having an interior volume, said lower housing having a bottom face, said bottom face having an orifice formed therethrough;

a locking leg, said locking leg having a cylindrical section and an elongated base, said elongated base being connected to said cylindrical section, a central axis of said cylindrical section being normal to a top surface of said elongated base, said locking leg having a lever arm extending from said cylindrical section, said lever arm extending perpendicular to said central axis of said cylindrical section, said cylindrical section communicating between said interior volume of said lower housing and said elongated base, said elongated base being located outside of said interior volume of said lower housing;

a vertical coupling means, said vertical coupling means mechanically connecting said plate with said lever arm;

a restoring spring, said restoring spring being located within said interior volume of said lower housing, said restoring spring being attached to said locking leg and said lower corner housing, said restoring spring communicating elastically between said locking leg and said lower housing, said restoring spring having a spring force such that a torsional force is applied to said locking leg about said central axis;

wherein a load is applied to said top surface of said plate, compressing said spring, said plate being forced down;

and wherein said vertical coupling means is actuated by the downward movement of said plate; said plate imparting a generally vertical motion on said vertical coupling means;

and wherein said vertical coupling means imparts a rotational motion on said lever arm, rotating said cylindrical section and said elongated base.

2. The shipping container locking system of claim 1 wherein said shipping container locking system is installed on a plurality of corners on said shipping container.

3. The shipping container locking system of claim 1 wherein said load applied to said top surface of said plate is a lifting spreader twist lock.

4. The shipping container locking system of claim 1 wherein said elongated leg is inserted into a receiving chamber of another shipping container, said rotational motion causing said elongated leg to lock within said receiving chamber.

5. The shipping container locking system of claim 1 includes a second shipping container locking system which is installed on a second upper corner of said shipping container and a second lower corner of said shipping container, the second locking system having a lever arm; wherein at least one tine well is interposed between the lower corners of said container; wherein a horizontal coupling means extends between the lever arm of the first locking system and the lever arm of the second locking system, intersecting said tine well; and wherein a tine of a lifting device is inserted into said tine well, imparting a deflection in said horizontal coupling means, and said horizontal coupling means imparts a rotational motion on the lever arms, rotating said cylindrical section and said elongated base.

6. The shipping container locking system of claim 5 wherein said rotational motion on the lever arms causes said locking leg to rotate into an unlocked position.

* * * * *